(12) United States Patent
Sundry et al.

(10) Patent No.: US 12,732,059 B2
(45) Date of Patent: Sep. 8, 2026

(54) ELECTRIC MOTOR ASSEMBLY WITH CARD EDGE CONNECTOR

(71) Applicant: THE TORO COMPANY, Bloomington, MN (US)

(72) Inventors: Evan D. Sundry, Eagan, MN (US); Christopher A. Stroth, Lakeville, MN (US)

(73) Assignee: THE TORO COMPANY, Bloomington, MN (US)

( * ) Notice: Subject to any disclaimer, the term of this patent is extended or adjusted under 35 U.S.C. 154(b) by 1198 days.

(21) Appl. No.: 17/708,193

(22) Filed: Mar. 30, 2022

(65) Prior Publication Data

US 2022/0337119 A1 Oct. 20, 2022

Related U.S. Application Data

(60) Provisional application No. 63/175,124, filed on Apr. 15, 2021.

(51) Int. Cl.
*H02K 5/22* (2006.01)
*H02K 5/10* (2006.01)
*H02K 11/33* (2016.01)

(52) U.S. Cl.
CPC ............... *H02K 5/225* (2013.01); *H02K 5/10* (2013.01); *H02K 11/33* (2016.01); *H02K 2211/03* (2013.01)

(58) Field of Classification Search
CPC ............................... H02K 5/225; H02K 11/33
See application file for complete search history.

(56) References Cited

U.S. PATENT DOCUMENTS

| | | | | |
|---|---|---|---|---|
| 8,139,364 | B2 | 3/2012 | Wickett | |
| 8,207,693 | B2 | 6/2012 | Hauser et al. | |
| 9,196,983 | B2 | 11/2015 | Saur et al. | |
| 10,608,375 | B2 | 3/2020 | Homme et al. | |
| 2005/0167183 | A1* | 8/2005 | Tominaga | H02K 11/33 180/444 |
| 2016/0248292 | A1* | 8/2016 | Takarai | H05K 5/061 |

(Continued)

FOREIGN PATENT DOCUMENTS

| | | |
|---|---|---|
| DE | 102014216518 A1 | 2/2016 |

OTHER PUBLICATIONS

"Engine control unit for small bikes," BOSCH, Accessed on Mar. 18, 2024, Retrieved from the Internet: <https://www.bosch-mobility.com/en/solutions/control-units/engine-control-unit-for-small-bikes/>, 7 pages.

*Primary Examiner* — Terrance L Kenerly
*Assistant Examiner* — Theodore L Perkins
(74) *Attorney, Agent, or Firm* — Mueting Raasch Group

(57) ABSTRACT

A power equipment apparatus may include a motor assembly including an electric motor, a motor controller, and a card edge connector. The electric motor may include a motor housing defining a cavity, a rotor disposed in the cavity, a stator disposed in the cavity, and a printed circuit board operatively coupled to the stator. The motor controller may include a controller housing, a printed circuit board disposed in the controller housing, and one or more processors operatively coupled to the printed circuit board of the motor controller. The card edge connector may be configured to operatively couple the printed circuit board of the electric motor and the printed circuit board of the motor controller.

25 Claims, 6 Drawing Sheets

(56) References Cited

U.S. PATENT DOCUMENTS

| | | | | |
|---|---|---|---|---|
| 2017/0077631 | A1* | 3/2017 | Mitteer | H05K 3/366 |
| 2017/0201144 | A1* | 7/2017 | Nishidate | H02K 5/225 |
| 2017/0324300 | A1* | 11/2017 | Yamashita | H02K 5/24 |
| 2020/0177052 | A1* | 6/2020 | Fujiwara | H02K 9/06 |
| 2020/0340297 | A1* | 10/2020 | Sonzini | H02K 11/33 |
| 2021/0091641 | A1* | 3/2021 | Hatakeyama | F04D 29/5806 |

* cited by examiner

ELECTRIC MOTOR ASSEMBLY WITH CARD EDGE CONNECTOR

The present application claims priority to and/or the benefit of U.S. Provisional Patent Application No. 63/175,124, filed 15 Apr. 2021, which is incorporated herein by reference in its entirety.

Embodiments of the present disclosure relate to electric motors and motor controllers and, more particularly, to motors and motor controllers for power equipment units (e.g., lawn mowers, utility loaders, and the like).

BACKGROUND

Power equipment units are well-known in both consumer and professional markets alike. While not an exhaustive list, such equipment may include walk-behind and riding lawn mowers, snow throwers, hand-held and body-carried devices such as trimmers, other vehicles such as stand-on and walk-behind compact utility loaders, and other indoor and outdoor equipment. Such equipment is available in a wide range of sizes and configurations to accommodate particular end-user needs. For example, lawn mowers may be configured as walk-behind or ride-on vehicles having grass cutting decks of varying cutting widths. To power the deck, as well as an optional propulsion system, such mowers may include an internal combustion engine.

More recently, power equipment units incorporating one or more battery-powered electric motors in place of the internal combustion engine have grown in popularity. Such vehicles typically include an electric motor controller to control the motor(s) during operation.

SUMMARY

Embodiments described herein may provide power equipment apparatus that include a motor assembly. The motor assembly may include an electric motor, a motor controller, and a card edge connector. The electric motor may include a motor housing, a rotor, a stator, and a printed circuit board. The motor housing may define a cavity. The rotor may be disposed in the cavity defined by the motor housing. The stator may be disposed in the cavity defined by the motor housing and include a plurality of motor windings. The stator may be operatively coupled to the rotor to convert electrical energy into mechanical energy. The printed circuit board may be operatively coupled to the plurality of motor windings and at least partially disposed in the cavity defined by the motor housing. The motor controller may include a controller housing, a printed circuit board, and one or more processors. The controller housing may be configured to couple to the motor housing. The printed circuit board may be disposed within the controller housing. One or more processors may be operatively coupled to the printed circuit board of the motor controller. The card edge connector may be configured to operatively couple the printed circuit board of the electric motor and the printed circuit board of the motor controller.

In other embodiments, an electric motor is provided for a power equipment apparatus. The electric motor may include a motor housing, a rotor, a stator, an output shaft, and a printed circuit board. The motor housing may define a cavity. The rotor may be disposed in the cavity defined by the motor housing. The stator may be disposed in the cavity defined by the motor housing and may include a plurality of motor windings. The stator may be operatively coupled to the rotor to convert electrical energy into mechanical energy. The output shaft may be connected to the rotor and configured to drive a tool of the power equipment apparatus. The printed circuit board may be operatively coupled to the plurality of motor windings. The printed circuit board may include a winding connection portion and a card edge. The winding connection portion may be disposed in the cavity defined by the motor housing. The card edge may be configured to engage with a card edge connector. The card edge may be disposed outside of the cavity.

In other embodiments, a motor controller may be provided for an electric motor of a power equipment apparatus. The motor controller may include a controller housing, a printed circuit board, one or more processors, and a card edge connector. The printed circuit board may be disposed within the controller housing. The one or more processors may be operatively coupled to the printed circuit board of the motor controller. The card edge connector may be configured to receive a card edge and operatively couple the card edge to the printed circuit board.

The above summary is not intended to describe each embodiment or every implementation. Rather, a more complete understanding of illustrative embodiments will become apparent and appreciated by reference to the following Detailed Description of Exemplary Embodiments and claims in view of the accompanying FIGURES of the drawing.

BRIEF DESCRIPTION OF THE VIEWS OF THE DRAWING

Exemplary embodiments will be further described with reference to the figures of the drawing, wherein.

Figure 1:
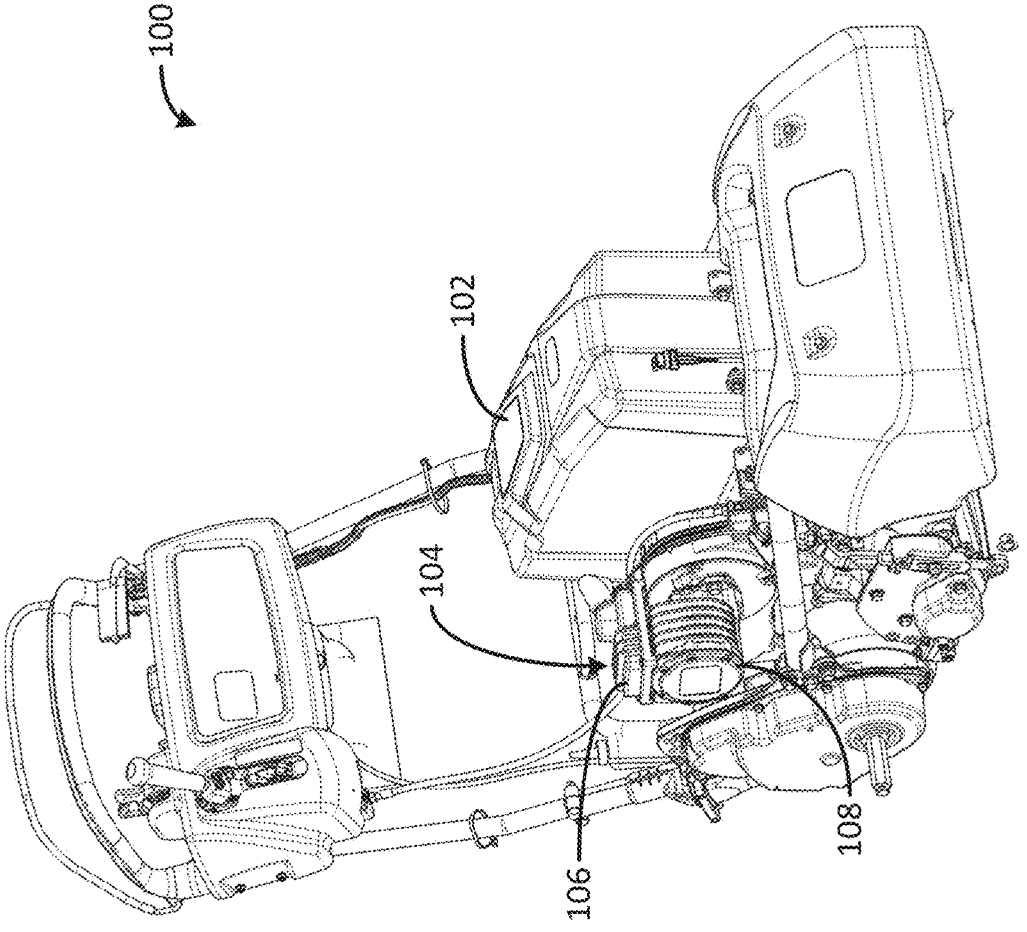
FIG. 1 illustrates a power equipment unit or apparatus including a motor assembly in accordance with embodiments of the present disclosure.

The FIGURES are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way.

DETAILED DESCRIPTION OF EXEMPLARY EMBODIMENTS

In the following detailed description of illustrative embodiments, reference is made to the accompanying FIGURES of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about." Further, the term "and/or" (if used) means one or all of the listed elements or a combination of any two or more of the listed elements. Still further, "i.e." may be used herein as an abbreviation for the Latin phrase id est and means "that is," while "e.g.," may be used as an abbreviation for the Latin phrase exempli gratia and means "for example."

It is noted that the terms "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the particular figure. These terms are used only to simplify the description, however, and not to limit the interpretation of any embodiment described.

Embodiments of the present disclosure are directed to motor assemblies including a motor controller, an electric motor, and a card edge connector. The card edge connector may operatively couple the motor controller and the electric motor. The card edge connector may facilitate a blind connection between the motor controller and the electric motor. Additionally, the connection process may be simplified as the connection of multiple motor windings to the motor controller are facilitated by the card edge connector rather than loose wires or individual connectors for each motor winding.

Aspects of the invention are defined in the claims. However, below is provided a non-exhaustive list of non-limiting examples. Any one or more of the features of these examples may be combined with any one or more features of another example, embodiment, or aspect described herein.

Example Ex1: A power equipment apparatus comprising a motor assembly, the motor assembly comprising: an electric motor comprising: a motor housing defining a cavity; a rotor disposed in the cavity defined by the motor housing; a stator disposed in the cavity defined by the motor housing and comprising a plurality of motor windings, the stator operatively coupled to the rotor to convert electrical energy into mechanical energy; and a printed circuit board operatively coupled to the plurality of motor windings and at least partially disposed in the cavity defined by the motor housing; a motor controller comprising: a controller housing configured to couple to the motor housing; a printed circuit board disposed within the controller housing; and one or more processors operatively coupled to the printed circuit board of the motor controller; and a card edge connector configured to operatively couple the printed circuit board of the electric motor and the printed circuit board of the motor controller.

Example Ex2: The apparatus as in example Ex1, further comprising a gasket configured to seal the printed circuit board of the motor controller from an external environment when the controller housing is coupled to the motor housing.

Example Ex3: The apparatus as in any one of the preceding examples, further comprising a power source operatively coupled to the motor controller and wherein the motor controller is configured to provide power from the power source to the plurality of motor windings.

Example Ex4: The apparatus as in any one of the preceding examples, wherein the printed circuit board of the electric motor comprises: a winding connection portion disposed in the cavity defined by the motor housing; and a card edge configured to engage with the card edge connector, the card edge disposed outside of the cavity.

Example Ex5: The apparatus as in any one of the preceding examples, wherein the printed circuit board of the electric motor and the printed circuit board of the motor controller are configured to be uncoupled when the controller housing is uncoupled from the motor housing.

Example Ex6: The apparatus as in any one of the preceding examples, wherein the cavity defined by the motor housing is sealed from an external environment.

Example Ex7: The apparatus as in any one of the preceding examples, the motor assembly further comprising one or more retainers configured to engage the motor housing and the controller housing such that the printed circuit board of the motor controller is sealed from an external environment and the printed circuit board of the electric motor and the printed circuit board of the motor controller are operatively coupled when the one or more retainers engage the motor housing and the controller housing.

Example Ex8: The apparatus as in any one of the preceding examples, wherein the motor assembly further comprises one or more guides configured to align the card edge connector and a card edge of the printed circuit board of the electric motor when the controller housing is coupled to the motor housing, and wherein the one or more guides are disposed on one or more of the controller housing, the printed circuit board operatively coupled to the plurality of motor windings, or the printed circuit board disposed within the controller housing.

Example Ex9: The apparatus as in example Ex8, wherein the one or more guides comprise an extension at two or more corners of the controller housing, wherein the extensions may be configured to contact the motor housing and align the card edge connector and the card edge prior to the card edge connector and the card edge contacting one another when the controller housing is coupled to the motor housing.

Example Ex10: The apparatus as in any one of the preceding examples, wherein the card edge connector provides a blind connection to operatively couple the printed circuit board of the electric motor and the printed circuit board of the motor controller.

Example Ex11: The apparatus as in any one of the preceding examples, wherein the printed circuit board of the motor controller comprises the card edge connector.

Example Ex12: The apparatus as in any one of the preceding examples, wherein the printed circuit board of the motor controller comprises: a power printed circuit board; and a control printed circuit board operatively coupled to the power printed circuit board, wherein the power printed circuit board and the control printed circuit board are perpendicular to one another.

Example Ex13: The apparatus as in example Ex12, wherein the control printed circuit board extends through an aperture of the power printed circuit board.

Example Ex14: An electric motor for a power equipment apparatus comprising: a motor housing defining a cavity; a rotor disposed in the cavity defined by the motor housing; a stator disposed in the cavity defined by the motor housing and comprising a plurality of motor windings, the stator operatively coupled to the rotor to convert electrical energy into mechanical energy; an output shaft connected to the rotor and configured to drive a tool of the power equipment apparatus; and a printed circuit board operatively coupled to the plurality of motor windings, the printed circuit board comprising: a winding connection portion disposed in the cavity defined by the motor housing; and a card edge configured to engage with a card edge connector, the card edge disposed outside of the cavity.

Example Ex15: The electric motor as in example Ex14, wherein the cavity defined by the motor housing is sealed from an external environment.

Example Ex16: The electric motor as in any one of examples Ex14-Ex15, wherein the motor housing comprises one or more guides configured to align the card edge connector and the card edge when a controller housing is coupled to the motor housing.

Example Ex17: A motor controller for an electric motor of a power equipment apparatus comprising: a controller housing; a printed circuit board disposed within the controller housing; one or more processors operatively coupled to the printed circuit board of the motor controller; and a card edge connector configured to receive a card edge and operatively couple the card edge to the printed circuit board.

Example Ex18: The motor controller as in example Ex17, wherein the controller housing comprises a gasket to engage with a motor housing of the power equipment apparatus to seal the motor controller from an external environment.

Example Ex19: The motor controller as in any one of examples Ex17-Ex18, wherein the controller housing or the printed circuit board further comprise one or more guides configured to align the card edge connector and the card edge when the controller housing is coupled to a motor housing.

Example Ex20: The motor controller as in any one of examples Ex17-Ex19, wherein the printed circuit board comprises: a power printed circuit board; and a control printed circuit board operatively coupled to the power printed circuit board, wherein the power printed circuit board and the control printed circuit board are perpendicular to one another.

Example Ex21: The motor controller as in example Ex20, wherein the control printed circuit board extend through an aperture of the power printed circuit board.

FIG. 1 illustrates a power equipment unit or apparatus 100. The power equipment apparatus 100 includes a power source 102 and a motor assembly 104. The motor assembly 104 may include a motor controller 106, and an electric motor 108. The power source 102 may include most any power source suitable for providing electrical power to power equipment that includes an electric motor (e.g., electric motor 108). Exemplary, power sources may include one or more of batteries, generators, fuel cells, super capacitors, solar panels, etc. The power source 102 may provide power to the motor assembly 104. For instance, the power source 102 may be operatively coupled to the motor controller 106. In turn, the motor controller 106 may be operatively coupled to the electric motor 108. The motor controller may be configured to provide power from the power source 102 to the electric motor 108 or motor windings (e.g., motor windings 134 of FIG. 3) of the electric motor 108. In other words, the motor controller 106 may be configured to control power supplied to the electric motor 108 to coordinate operation and performance of the electric motor 108. The motor controller 106 may be configured to, for example, start the electric motor 108, stop the electric motor 108, select forward or reverse rotation of the electric motor 108, select and regulate the speed of the electric motor 108, regulate or limit the torque of the electric motor 108, determine a location of the electric motor 108 on the apparatus 100, and protect against overloads and electrical faults of the electric motor 108. Determining the location of the electric motor 108 may include reading an address in hardware or software assigned to the electric motor 108.

As used herein, "operatively coupled" generally refers to a direct or indirect connection that may be wired or wireless that provides a link for power and/or communication between apparatus or systems. Wired data communication may include, or utilize, any suitable hardware connection such as, e.g., advanced microcontroller bus architecture (AMBA), ethernet, peripheral component interconnect (PCI), PCI express (PCIe), optical fiber, local area network (LAN), etc. Wireless communication may include, or utilize, any suitable wireless connection such as, e.g., Wireless Fidelity (Wi-Fi), cellular network, Bluetooth, near-field communication (NFC), optical, infra-red (IR), optical, trench bounded photons, Wireless Network-on-Chip (WNoC), etc.

Figure 2:
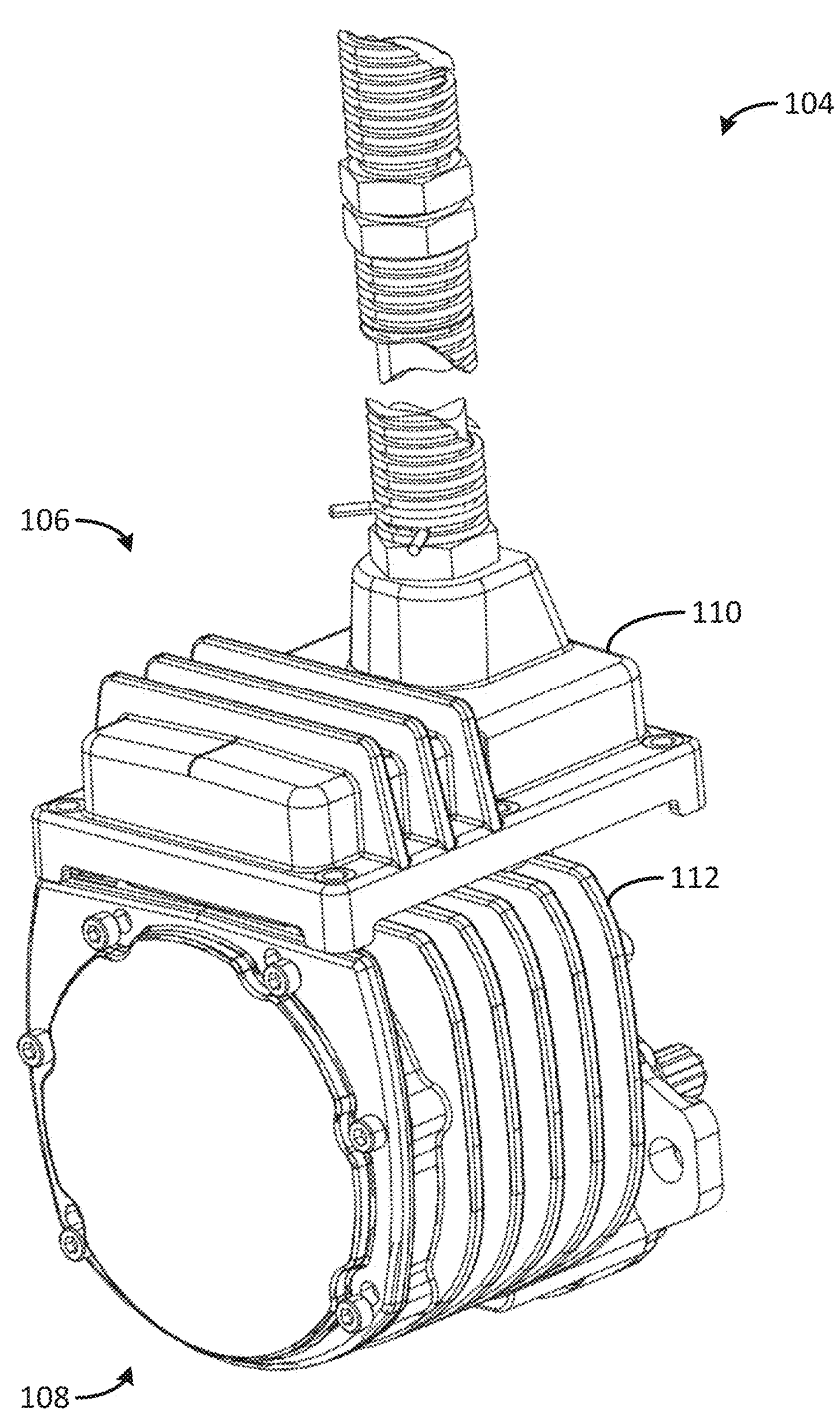
FIG. 2 is an isometric view of an exemplary motor assembly.
Figure 3:
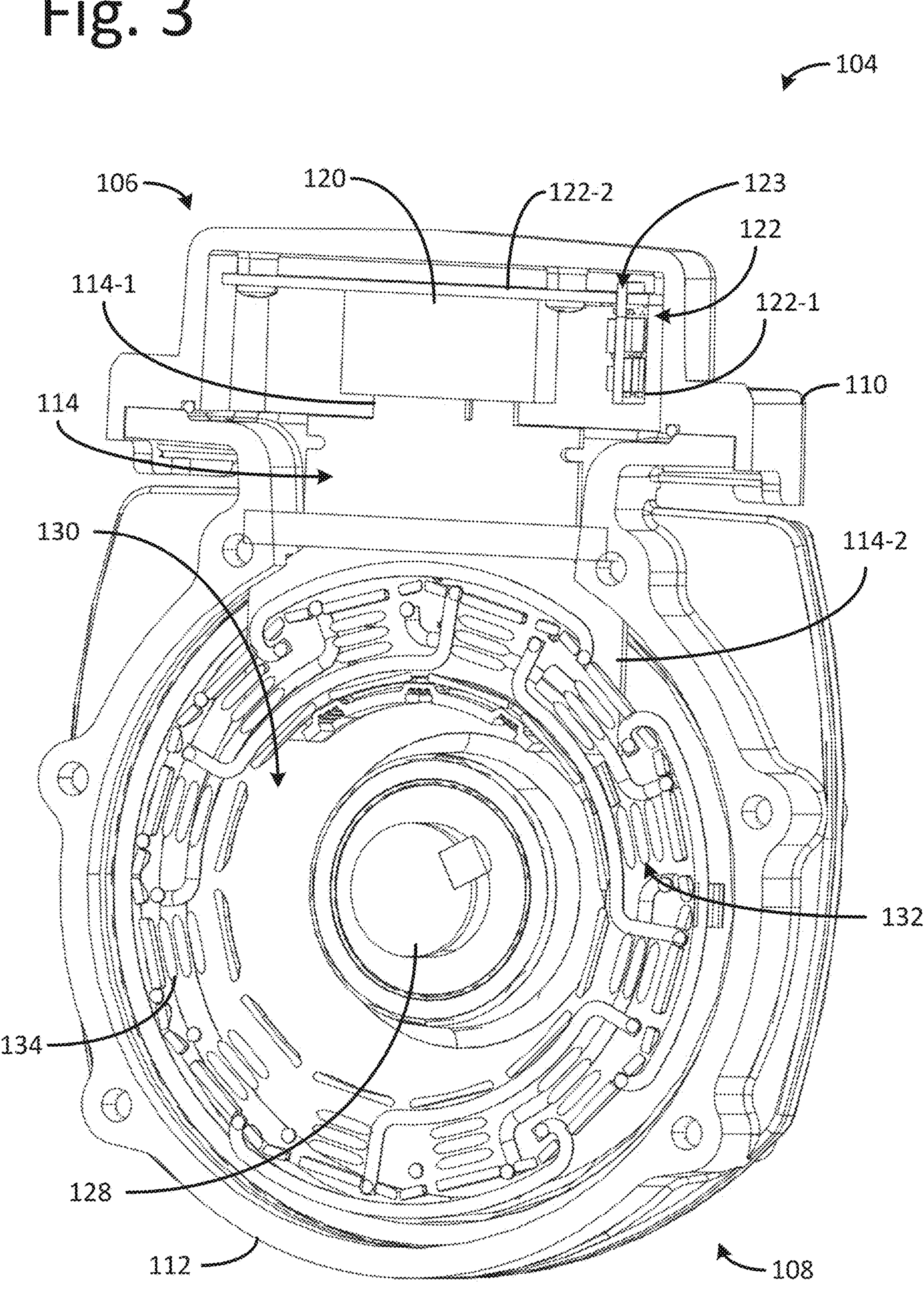
FIG. 3 is a cross-sectional isometric view of the motor assembly of FIG. 2.
Figure 4:
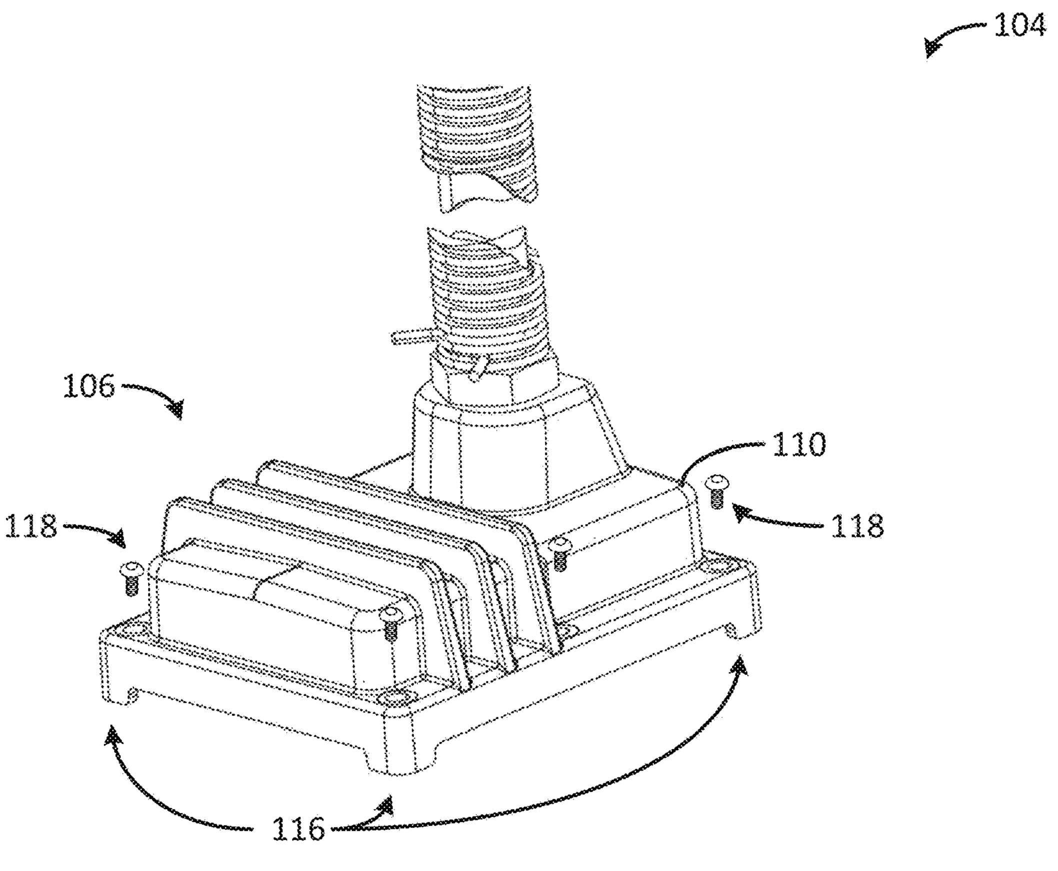
FIG. 4 is another isometric view of the motor assembly of FIGS. 2 and 3 with a motor controller shown exploded from a motor of the motor assembly.
Figure 4:
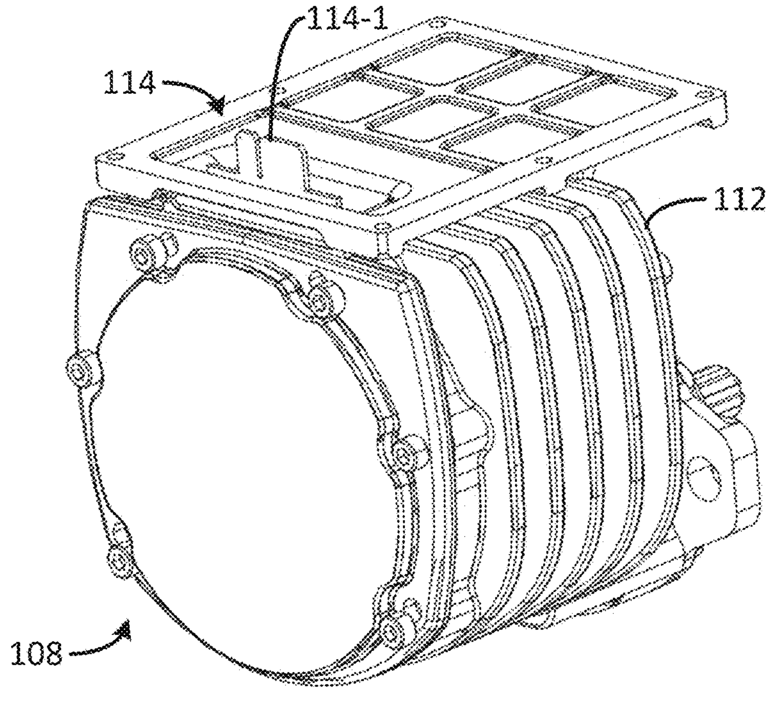

FIGS. 2-4 illustrate an exemplary motor assembly 104 including a motor controller 106 and an electric motor 108. FIG. 2 is an isometric view of the motor assembly 104 with the motor controller 106 and the electric motor 108 operatively coupled to one another. FIG. 3 is a cross-sectional isometric view of the motor assembly 104 with the motor controller 106 and the electric motor 108 operatively coupled to one another. FIG. 4 is an isometric view of the motor assembly with the motor controller 106 and the electric motor 108 separated from one another.

The exemplary electric motor 108 may include a motor housing 112. The motor housing 112 may define a cavity 130 (see FIG. 3). The cavity 130 may be an interior space of the motor housing 112 that houses or includes one or more components, devices, or apparatus of the electric motor. For instance, the electric motor 108 may include a rotor 128 and a stator 132 disposed in the cavity 130 defined by the motor housing 112. The motor housing 112 may be configured such that the cavity 130 is, e.g., sealed from an external environment, to reduce or eliminate water, dust, and/or other debris ingress. In addition, the motor housing 112 may provide robust impact protection for the components, devices, and apparatus contained therein. The stator may include a plurality of motor windings 134. The stator 132 may be operatively coupled to the rotor 128 to convert electrical energy into mechanical energy. In other words, power can be provided to the motor windings 134 to induce magnetic fields that cause the rotor 128 to rotate or spin.

The electric motor 108 may include a printed circuit board 114. The printed circuit board 114 may be operatively coupled to the motor windings 134 to provide power to the motor windings 134. The printed circuit board 114 may be at least partially disposed in the cavity 130 defined by the motor housing 112. For example, the printed circuit board 114 may include a winding connection portion 114-2 disposed in the cavity 130 defined by the motor housing 112. The winding connection portion 114-2 may be operatively coupled to the stator 132 or the motor windings 134. In some embodiments, the motor windings 134 may be soldered to the winding connection portion 114-2.

The printed circuit board 114 may further include a card edge 114-1. The card edge 114-1 and the winding connection portion 114-2 may be referred to, individually or collectively, as printed circuit board 114. The card edge 114-1 may be disposed at least partially outside of the cavity 130 defined by the motor housing 112. The card edge 114-1 may be configured to engage or mate with a card edge connecter (e.g., card edge connector 120). For example, the card edge 114-1 may include one or more protrusions configured to engage with one or more slots or recesses (e.g., slots or recesses 136 of FIG. 5) of the card edge connector. The card edge 114-1 may include exposed electrical contacts configured to engage with electrical contacts of the card edge connector 120 of the motor assembly 104 to operatively couple the motor to the motor controller 106.

The motor controller 106 may include a controller housing 110. The controller housing 110 may be configured, e.g., sealed, to reduce or eliminate water, dust, and/or other debris ingress when coupled to the motor housing 112. In addition, the controller housing 110 may provide robust impact protection for the components, devices, and apparatus contained therein. The motor controller 106 may include a printed circuit board 122 and one or more processors 124 (see FIG. 5). The printed circuit board 122 may be disposed within the controller housing 110. The one or more processors 124 may be operatively coupled to the printed circuit board 122 of the motor controller 106.

The motor controller 106 may be operatively coupled to a power source (e.g., the power source 102 of FIG. 1). The motor controller 106 may be configured to provide power from the power source to the plurality of motor windings 134. The motor controller 106 may be configured to provide power to the motor windings 134 to coordinate operation and performance of the electric motor 108. The motor controller 106 may be configured to provide power to the motor windings 134 to, for example, start the electric motor 108, stop the electric motor 108, select forward or reverse rotation of the electric motor 108, select and regulate the speed of the electric motor 108, regulate or limit the torque of the electric motor 108, and protect against overloads and electrical faults of the electric motor 108. Power may be provided via the printed circuit board 122 of the motor controller 106.

The printed circuit board 122 of the motor controller 106 may include a control printed circuit board 122-1 and a power printed circuit board 122-2 (referred to individually or collectively as printed circuit board 122). The control printed circuit board 122-1 may include the one or more processors 124, memory, logic, and other control circuitry of the printed circuit board 122. The power printed circuit board 122-2 may include power electronics, switches, and other components for regulating power provided to the electric motor 108. The power electronics, switches, and other components of the power printed circuit board 122-2 may be controlled by the control printed circuit board 122-1.

The power printed circuit board 122-2 and the control printed circuit board 122-1 may be perpendicular to one another. The perpendicular arrangement of the power printed circuit board 122-2 and the control printed circuit board 122-1 may improve stability and vibration characteristics of the motor controller 106. For example, the perpendicular arrangement of the power printed circuit board 122-2 and the control printed circuit board 122-1 may provide additional rigidity or stiffness to both printed circuit boards. Individual printed circuit boards may be thin (e.g., less than 2 millimeters thick) and susceptible to bending when force is applied perpendicular to the plane of such printed circuit boards. However, printed circuit boards are generally rigid when force is applied parallel to the plane of the printed circuit boards. Thus, the perpendicular arrangement of the power printed circuit board 122-2 and the control printed circuit board 122-1 may allow both boards to have additional stiffness and resistance to perpendicular forces which reduces vibration. Furthermore, the perpendicular arrangement may allow a reduced width and or length of the motor controller 106 without increasing height of the motor controller. The control printed circuit board 122-1 may extend from a surface of the power printed circuit board 122-2. As shown in FIG. 3, at least a portion of the control printed circuit board 122-1 may extend through an aperture 123 in the power printed circuit board 122-2. The printed circuit board 122 may be operatively coupled to the printed circuit board 114 of the motor via a card edge connector 120.

The motor assembly 104 (e.g., the motor controller 106) may include the card edge connector 120. The card edge connector 120 may be configured to operatively couple the printed circuit board 114 of the electric motor 108 and the printed circuit board 122 of the motor controller 106. Accordingly, the card edge connector 120 may facilitate power transfer and communication between the motor controller 106 and the electric motor 108. To engage with a card edge, the card edge connector 120 may include one or more slots (e.g., slots 136 of FIG. 5) to receive the card edge (e.g., card edge 114-1). Furthermore, the card edge connector 120 may include one or more exposed electrical contacts to engage with electrical contacts of a card edge received in the one or more slots. As shown, the card edge connector 120 is coupled or connected to the printed circuit board 122 of the motor controller 106 and the card edge 114-1 is a part of the printed circuit board 114 of the electric motor 108. However, in one or more embodiments, the card edge connector 120 may be coupled or connected to the printed circuit board 114 of the electric motor 108 and the card edge may be a part of the printed circuit board 122 of the motor controller 106.

The card edge connector 120 may provide or facilitate a blind connection to operatively couple the printed circuit board 114 of the electric motor 108 and the printed circuit board 122 of the motor controller 106. In other words, the card edge connector 120 may allow the motor controller 106 to be operatively coupled to the electric motor 108 without internal components (e.g., the printed circuit boards 114, 122 or the card edge connector 120) being visible to a user during the coupling process. Furthermore, the printed circuit board 114 of the electric motor 108 and the printed circuit board 122 of the motor controller 106 may be configured to be uncoupled when the controller housing 110 is uncoupled from the motor housing 112. In addition, the motor assembly 104 may include one or more apparatus or devices to facilitate operatively coupling the motor controller 106 to the electric motor 108.

The motor assembly 104 may include one or more retainers 118 to retain or secure the motor controller 106 to the electric motor 108. The retainers 118 may include, for example, one or more of screws, latches, fasteners, clips, magnets, etc. Such retainers may be configured to couple the controller housing 110 of the motor controller 106 to the motor housing 112 of the electric motor 108. The retainers 118 may be configured to engage the controller housing 110 and the motor housing 112 such that the printed circuit board 122 of the motor controller 106 is sealed from an external environment. In addition, the printed circuit board 114 of the electric motor 108 and the printed circuit board 122 of the motor controller 106 may be operatively coupled when the one or more retainers 118 engage the controller housing 110 and the motor housing 112.

The motor assembly 104 may further include one or more guides 116. The guides 116 may be configured to align the card edge connector 120 and the card edge 114-1 of the printed circuit board 114 of the electric motor 108 when the controller housing 110 is coupled to the motor housing 112. The one or more guides 116 may include an extension at two or more corners of the controller housing 110. The extensions may be configured to contact the motor housing 112 and align the card edge connector 120 and the card edge 114-1 prior to the card edge connector 120 and the card edge 114-1 contacting one another when the controller housing 110 is coupled to the motor housing 112. Although shown disposed on the controller housing 110, the one or more guides 116 may be disposed on any suitable component or apparatus of the motor assembly 104. The one or more guides 116 may be disposed, for example, on one or more of the controller housing 110, the motor housing 112, the printed circuit board 114 of the electric motor 108, and/or the printed circuit board 122 of the motor controller 106.

Figure 5:
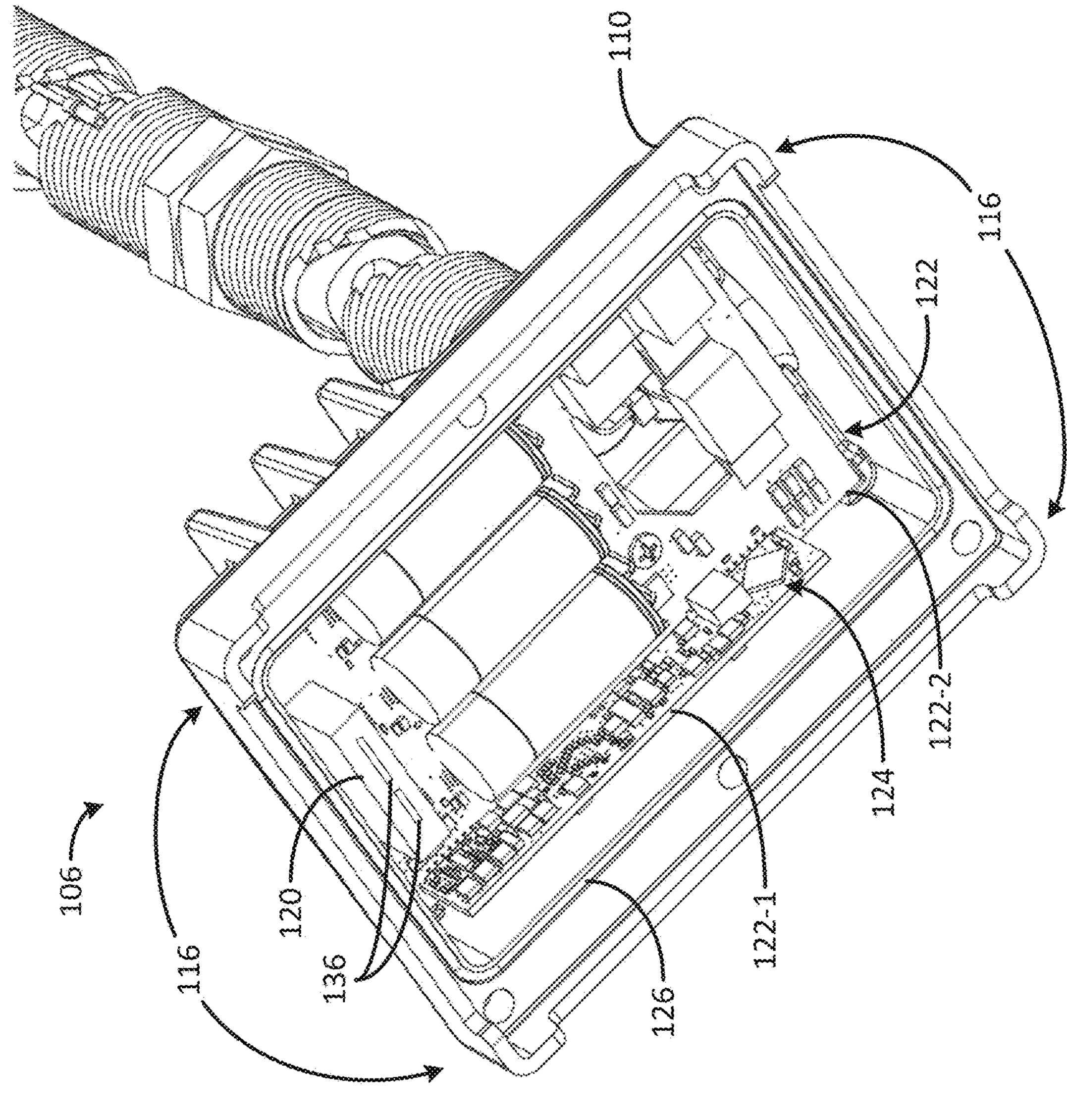
FIG. 5 is an isometric view of the motor controller of FIGS. 2-4.

FIG. 5 illustrates an isometric view of the exemplary motor controller 106 of FIGS. 2-4 that depicts additional details of some embodiments of the controller housing 110. In this embodiment, the controller housing 110 may include a gasket 126 to engage with the motor housing 112 of the electric motor 108 to seal internal components (e.g., printed circuit board 122) of the motor controller 106 from an external environment. Such gasket 126 may extend around an interior edge of the controller housing 110. In some embodiments, the gasket 126 may be included as part of the motor housing 110 or be a separate component of the motor assembly 104. The gasket 126 may be flexible or compressible to seal the printed circuit board 122 of the motor controller 106 from an external environment when the controller housing 110 is coupled to the motor housing 112. The gasket 126 may include any suitable material or materials such as, for example, rubber, foam, plastic, or other materials capable of forming a seal with the motor housing 112.

As shown, the card edge connector 120 may be disposed in the controller housing 110. The card edge connector 120 may include one or more slots or recesses 136 configured to receive the card edge 114-1. The card edge connector 120 may be perpendicular to at least a portion of the printed circuit board 122 (e.g., the power printed circuit board 122-2). The card edge connector 120 may be soldered to or integrally formed with the printed circuit board 122.

Figure 6:
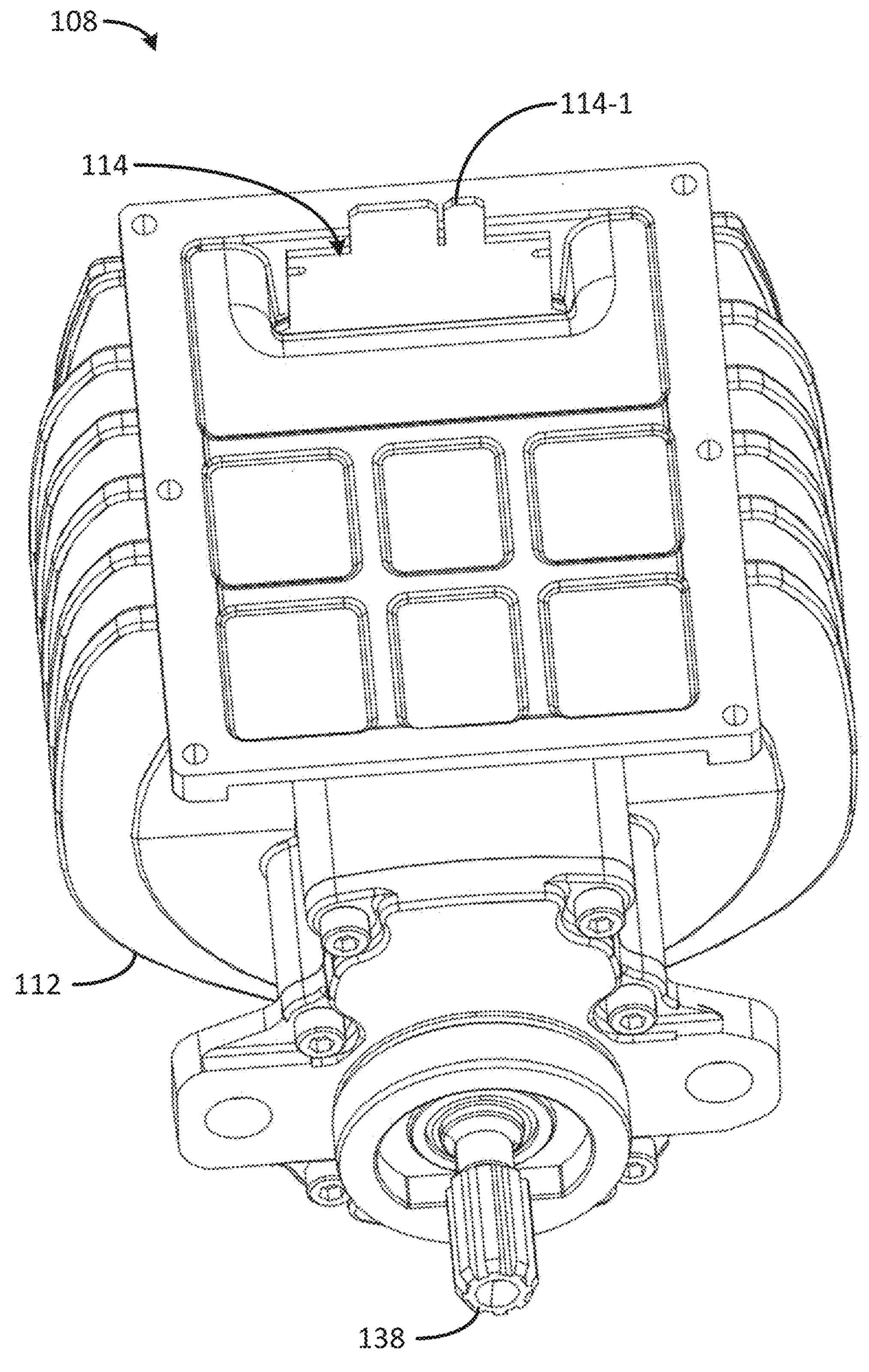
FIG. 6 is an isometric view of the electric motor of FIGS. 2-4.

FIG. 6 illustrates an isometric view of the exemplary electric motor 108 of FIGS. 2-4. As shown, a portion of the printed circuit board 114 extends outside of the motor housing 112. For example, the card edge 114-1 may extend outside of the cavity 130 of the motor housing 112. The electric motor 108 may further include an output shaft 138 connected to the rotor 128. Unlike the rotor 128, the output shaft 138 may extend outside of the motor housing 112. By extending outside of the motor housing, the output shaft 138 may be configured to drive any system including a propulsion system and/or a tool of a power equipment apparatus (e.g., power equipment apparatus 100 of FIG. 1).

The techniques described in this disclosure, including those attributed to the communication devices, or various constituent components, may be implemented, at least in part, in hardware, software, firmware, or any combination thereof. For example, various aspects of the techniques may be implemented by the motor controller (e.g., motor controller 106 as described herein), which may use one or more processors such as, e.g., one or more microprocessors, DSPs, ASICs, FPGAs, CPLDs, microcontrollers, or any other equivalent integrated or discrete logic circuitry, as well as any combinations of such components, image processing devices, or other devices. The term "processing apparatus," "processor," or "processing circuitry" may generally refer to any of the foregoing logic circuitry, alone or in combination with other logic circuitry, or any other equivalent circuitry. Additionally, the use of the word "processor" may not be limited to the use of a single processor but is intended to connote that at least one processor may be used to perform the exemplary techniques and processes described herein.

Such hardware, software, and/or firmware may be implemented within the same device or within separate devices to support the various operations and functions described in this disclosure. In addition, any of the described components may be implemented together or separately as discrete but interoperable logic devices. Depiction of different features, e.g., using block diagrams, etc., is intended to highlight different functional aspects and does not necessarily imply that such features must be realized by separate hardware or software components. Rather, functionality may be performed by separate hardware or software components, or integrated within common or separate hardware or software components.

When implemented in software, the functionality ascribed to the systems, devices and techniques described in this disclosure may be embodied as instructions on a computer-readable medium such as RAM, ROM, NVRAM, EEPROM, FLASH memory, magnetic data storage media, optical data storage media, or the like. The instructions may be executed by the processing apparatus to support one or more aspects of the functionality described in this disclosure.

Illustrative embodiments are described and reference has been made to possible variations of the same. These and other variations, combinations, and modifications will be apparent to those skilled in the art, and it should be understood that this invention is not limited to the illustrative embodiments set forth herein.

What is claimed is:

1. A power equipment apparatus comprising a motor assembly, the motor assembly comprising:
- an electric motor comprising:
  - a motor housing defining a cavity;
  - a rotor disposed in the cavity defined by the motor housing;
  - a stator disposed in the cavity defined by the motor housing and comprising a plurality of motor windings, the stator operatively coupled to the rotor to convert electrical energy into mechanical energy; and
  - a printed circuit board including a card edge and operatively coupled to the plurality of motor windings and at least partially disposed in the cavity defined by the motor housing;
- a motor controller comprising:
  - a controller housing configured to couple to the motor housing;
  - a printed circuit board disposed within the controller housing; and
  - one or more processors operatively coupled to the printed circuit board of the motor controller;
- a card edge connector configured to operatively couple the printed circuit board of the electric motor and the printed circuit board of the motor controller; and
- one or more guides configured to align the card edge connector and the card edge when the controller housing is coupled to the motor housing, wherein the one or more guides are disposed on one or more of the controller housing, the printed circuit board operatively coupled to the plurality of motor windings, or the printed circuit board disposed within the controller housing.

2. The power equipment apparatus as in claim 1, further comprising a gasket configured to seal the printed circuit board of the motor controller from an external environment when the controller housing is coupled to the motor housing.

3. The power equipment apparatus as in claim 1, further comprising a power source operatively coupled to the motor controller and wherein the motor controller is configured to provide power from the power source to the plurality of motor windings.

4. The power equipment apparatus as in claim 1, wherein the printed circuit board of the electric motor comprises:

a winding connection portion disposed in the cavity defined by the motor housing; and a card edge configured to engage with the card edge connector, the card edge disposed outside of the cavity.

5. The power equipment apparatus as in claim 1, wherein the printed circuit board of the electric motor and the printed circuit board of the motor controller are configured to be uncoupled when the controller housing is uncoupled from the motor housing.

6. The power equipment apparatus as in claim 1, wherein the cavity defined by the motor housing is sealed from an external environment.

7. The power equipment apparatus as in claim 1, the motor assembly further comprising one or more retainers configured to engage the motor housing and the controller housing such that the printed circuit board of the motor controller is sealed from an external environment and the printed circuit board of the electric motor and the printed circuit board of the motor controller are operatively coupled when the one or more retainers engage the motor housing and the controller housing.

8. The power equipment apparatus as in claim 1, wherein the one or more guides comprise an extension at two or more corners of the controller housing, wherein the extensions may be configured to contact the motor housing and align the card edge connector and the card edge prior to the card edge connector and the card edge contacting one another when the controller housing is coupled to the motor housing.

9. The power equipment apparatus as in claim 1, wherein the card edge connector provides a blind connection to operatively couple the printed circuit board of the electric motor and the printed circuit board of the motor controller.

10. The power equipment apparatus as in claim 1, wherein the printed circuit board of the motor controller comprises the card edge connector.

11. The power equipment apparatus as in claim 1, wherein the printed circuit board of the motor controller comprises:

a power printed circuit board; and a control printed circuit board operatively coupled to the power printed circuit board, wherein the power printed circuit board and the control printed circuit board are perpendicular to one another.

12. The power equipment apparatus as in claim 11, wherein the control printed circuit board extends through an aperture of the power printed circuit board.

13. An electric motor for a power equipment apparatus comprising:

a motor housing defining a cavity comprises one or more guides;

a rotor disposed in the cavity defined by the motor housing;

a stator disposed in the cavity defined by the motor housing and comprising a plurality of motor windings, the stator operatively coupled to the rotor to convert electrical energy into mechanical energy;

an output shaft connected to the rotor and configured to drive a tool of the power equipment apparatus; and a printed circuit board operatively coupled to the plurality of motor windings, the printed circuit board comprising:

a winding connection portion disposed in the cavity defined by the motor housing; and a card edge configured to engage with a card edge connector, the card edge disposed outside of the cavity wherein the one or more guides are configured to align the card edge connector and the card edge when a controller housing is coupled to the motor housing.

14. The electric motor as in claim 13, wherein the cavity defined by the motor housing is sealed from an external environment.

15. A motor controller for an electric motor of a power equipment apparatus comprising:

a controller housing;

a printed circuit board disposed within the controller housing and comprising:

a power printed circuit board defining an aperture; and a control printed circuit board operatively coupled to the power printed circuit board, wherein the control printed circuit board extends through an aperture of the power printed circuit board;

one or more processors operatively coupled to the printed circuit board of the motor controller; and a card edge connector configured to receive a card edge and operatively couple the card edge to the printed circuit board.

16. The motor controller as in claim 15, wherein the controller housing comprises a gasket to engage with a motor housing of the power equipment apparatus to seal the motor controller from an external environment.

17. The motor controller as in claim 15, wherein the controller housing or the printed circuit board further comprise one or more guides configured to align the card edge connector and the card edge when the controller housing is coupled to a motor housing.

18. The motor controller as in claim 15, wherein the power printed circuit board and the control printed circuit board are perpendicular to one another.

19. A power equipment apparatus for turf care and comprising:

a mowing unit comprising:

a power source comprising a battery or a generator;

a grass-cutting tool; and a motor assembly operably coupled to the power source comprising:

an electric motor comprising:

a motor housing defining a cavity;

a rotor disposed in the cavity defined by the motor housing;

a stator disposed in the cavity defined by the motor housing and comprising a plurality of motor windings, the stator operatively coupled to the rotor to convert electrical energy into mechanical energy;

an output shaft connected to the rotor and configured to drive the grass-cutting tool; and a first printed circuit board including a card edge and operatively coupled to the plurality of motor windings and at least partially disposed in the cavity defined by the motor housing;

a motor controller comprising:

a controller housing configured to couple to and environmentally sealed to the motor housing;

a second printed circuit board disposed within the controller housing; and one or more processors operatively coupled to the second printed circuit board; and a card edge connector configured to operatively couple the first printed circuit board and the second printed circuit board, wherein the first printed circuit board of the electric motor and the second printed circuit board of the motor controller are configured to be uncoupled when the controller housing is uncoupled from the motor housing.

20. The power equipment apparatus of claim 19, further comprising:

one or more guides configured to align the card edge connector and the card edge when the controller housing is coupled to the motor housing, wherein the one or more guides are disposed on one or more of the controller housing, the first printed circuit board, or the second printed circuit board.

21. The power equipment apparatus of claim 19, further comprising a gasket configured to seal the printed circuit board of the motor controller from an external environment when the controller housing is coupled to the motor housing.

22. The power equipment apparatus of claim 19, wherein the printed circuit board of the motor controller comprises:

a power printed circuit board; and a control printed circuit board operatively coupled to the power printed circuit board, wherein the power printed circuit board and the control printed circuit board are perpendicular to one another.

23. The power equipment apparatus of claim 22, wherein the control printed circuit board extends through an aperture of the power printed circuit board.

24. The power equipment apparatus of claim 19, wherein the second printed circuit board comprises a printed circuit board substantially parallel to an axis defined by the output shaft.

25. The power equipment apparatus of claim 19, wherein at least one of the card edge or the card edge connector is substantially perpendicular to an axis defined by the output shaft.

* * * * *